(No Model.)

G. W. MILTIMORE.
CAR WHEEL.

No. 291,618. Patented Jan. 8, 1884.

Attest:
A. N. Jasbera
Geo. H. Graham

Inventor,
George W. Miltimore,
by Munson & Philipp
Attys.

UNITED STATES PATENT OFFICE.

GEORGE W. MILTIMORE, OF CHICAGO, ILLINOIS.

CAR-WHEEL.

SPECIFICATION forming part of Letters Patent No. 291,618, dated January 8, 1884.

Application filed August 10, 1883. (No model.)

*To all whom it may concern:*

Be it known that I, GEORGE W. MILTIMORE, a citizen of the United States, residing in the city of Chicago, county of Cook, and State of Illinois, have invented certain new and useful Improvements in Car-Wheels, fully described and represented in the following specification and the accompanying drawings, forming a part of the same.

Wheels for railway-cars were formerly almost universally made of cast-iron, and in a single piece. To obviate the many disadvantages attending the use of wheels made of this material and in this manner, principal among which is their liability to crack, particularly in cold weather, it has in recent years been found desirable to make these wheels by building them up from separate parts—that is to say, making the rim, spokes, and hub in separate pieces.

The present invention relates to this last-named class of wheels, and particularly to a wheel having the general features of construction shown and described in United States Letters Patent Nos. 261,944, 262,909, 262,910, and 267,916. In the construction shown in said Letters Patent the rim of the wheel is made independent of the spokes, and is held in position only by the pressure of the spokes and by tenons upon their outer ends, which enter mortises in its inner periphery, from which it results that in case the rim should become cracked or broken there is nothing to prevent the pieces of the rim from flying away from the spokes, thus instantly destroying the wheel, and causing great danger to the train, if the same is in motion.

It is the object of the present invention to provide means for curing this defect; and to that end the invention consists in the features of construction hereinafter described and pointed out, by which, in case the rim of the wheel should become cracked or broken, its pieces will be held in position, so as to prevent danger of wreckage until the break is discovered.

Figure 1:
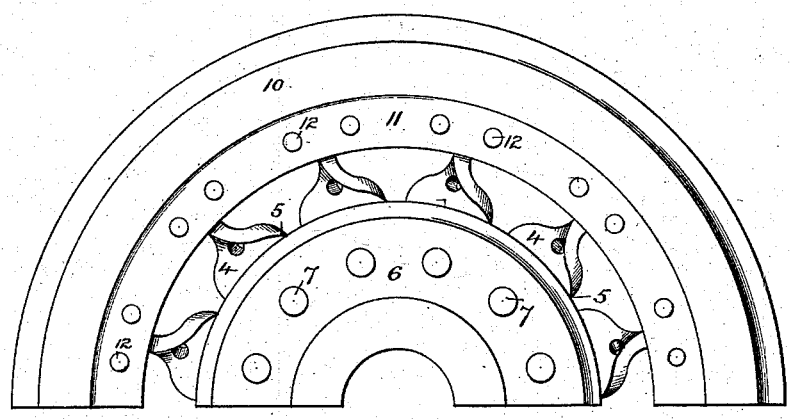
Figure 2:
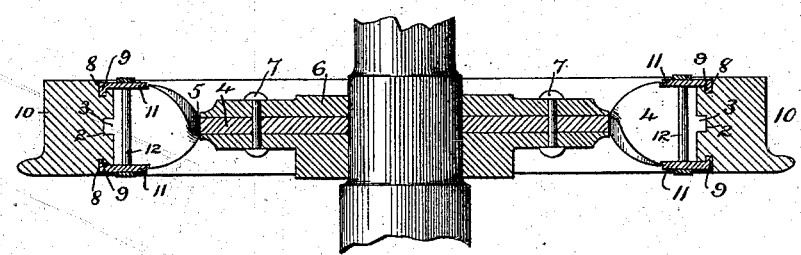

In the accompanying drawings, Figure 1 is a side elevation of one-half of a wheel embodying the present invention. Fig. 2 is a cross-section of the same.

The wheel shown in the present case is, as already stated, in its general construction, the same as that shown in the Letters Patent referred to. A very brief description will therefore suffice for those parts which are common to both. The rim 10 of the wheel, which is of cast or wrought iron or steel, is of the usual shape, and is provided around its inner periphery with a series of mortises, 2, to receive the tenons 3 of the spokes. The spokes 4 are made of common commercial bar-iron, cut to the proper length, beveled at their inner ends, and twisted by a quarter-turn, to provide the shoulders 5 on both sides for the hub-plates 6 to rest against, said plates being secured in position upon the opposite sides of the spokes by the bolts 7, all as shown and described in the Letters Patent referred to.

It will readily be seen that if no provision is made other than the tenons 3 and the pressure of the spokes for retaining the rim 10 in position, the latter, if it should become cracked or broken, would immediately fly away from the spokes and destroy the wheel. To obviate this the rim 10 is in the present case provided upon its opposite sides with grooves 8, which extend around the entire circumference of the rim, and receive the inwardly-projecting flanges 9 of a pair of annular plates, 11, which are held in position by suitable bolts or rivets, 12, passing upon the opposite sides of the spokes, as shown in the drawings. By reason of this arrangement it will readily be seen that in case the rim becomes broken the flanges 9 will hold its pieces in position, so as to prevent the entire destruction of the wheel before the break is discovered.

The plates 11 are made of wrought-iron or steel, and, as they are not subjected to any considerable strain, are not liable to become cracked or broken.

What I claim is—

The combination, with the hub-plates 6 and the twisted spokes 4, of the rim 10, provided with the grooves 8, the annular plates 11, provided with the flanges 9, and the bolts 12, passing through said plates 11 between the spokes, all substantially as described.

In testimony whereof I have hereunto set my hand in the presence of two subscribing witnesses.

GEORGE W. MILTIMORE.

Witnesses:
AARON M. MCKAY,
CHAS. H. BARSTOW.